US011710032B2

(12) United States Patent
Singh et al.

(10) Patent No.: US 11,710,032 B2
(45) Date of Patent: Jul. 25, 2023

(54) POOLING UNIT FOR DEEP LEARNING ACCELERATION

(71) Applicants: STMICROELECTRONICS INTERNATIONAL N.V., Geneva (CH); STMICROELECTRONICS S.R.L., Agrate Brianza (IT)

(72) Inventors: Surinder Pal Singh, Noida (IN); Thomas Boesch, Rovio (CH); Giuseppe Desoli, San Fermo Della Battaglia (IT)

(73) Assignees: STMICROELECTRONICS INTERNATIONAL N.V., Geneva (CH); STMICROELECTRONICS S.R.L., Agrate Brianza (IT)

( * ) Notice: Subject to any disclaimer, the term of this patent is extended or adjusted under 35 U.S.C. 154(b) by 0 days.

(21) Appl. No.: 18/055,245

(22) Filed: Nov. 14, 2022

(65) Prior Publication Data

US 2023/0135185 A1    May 4, 2023

Related U.S. Application Data

(62) Division of application No. 16/799,671, filed on Feb. 24, 2020, now Pat. No. 11,507,831.

(51) Int. Cl.
*G06N 3/063* (2023.01)
*G06F 17/18* (2006.01)
(Continued)

(52) U.S. Cl.
CPC ............ *G06N 3/063* (2013.01); *G06F 17/18* (2013.01); *G06F 18/217* (2023.01); *G06N 3/04* (2013.01); *G06N 3/08* (2013.01)

(58) Field of Classification Search
CPC ............ G06N 3/08; G06N 3/04; G06N 3/063; G06N 3/0454; G06N 3/0481; G06N 3/084;
(Continued)

(56) References Cited

U.S. PATENT DOCUMENTS 5,768,613 A    6/1998  Asghar
5,996,058 A   11/1999  Song et al.
(Continued)

FOREIGN PATENT DOCUMENTS

CN    101739241 A    6/2010
CN    104484703 A    4/2015
(Continued)

OTHER PUBLICATIONS

Bhatele et al (Ed)., *Programming and Performance Visualization Tools*, Springer Publishing, New York, New York, 2018, pp. 74-89, Pradelle et al., "Polyhedral Optimization of TensorFlow Computation Graphs," 7 pages.
(Continued)

*Primary Examiner* — Michael S Osinski
(74) *Attorney, Agent, or Firm* — Seed IP Law Group LLP

(57) ABSTRACT

A convolutional neural network includes a pooling unit. The pooling unit performs pooling operations between convolution layers of the convolutional neural network. The pooling unit includes hardware blocks that promote computational and area efficiency in the convolutional neural network.

20 Claims, 8 Drawing Sheets

(51) Int. Cl.
*G06N 3/04* (2023.01)
*G06N 3/08* (2023.01)
*G06F 18/21* (2023.01)

(58) Field of Classification Search
CPC ........ G06N 3/082; G06N 3/088; G06F 17/18; G06F 17/15; G06F 17/16; G06F 18/217; G06K 9/6262; G06K 9/6232; G06K 9/6256; G06T 1/20; G06T 2207/20084; G06T 2207/20081; G06T 7/11; G06V 10/82; G06V 10/764; G06V 10/454; G06V 20/10; G06V 10/25
See application file for complete search history.

(56) References Cited

U.S. PATENT DOCUMENTS

| | | | |
|---|---|---|---|
| 9,436,637 | B2 | 9/2016 | Kommanaboyina |
| 10,176,551 | B2* | 1/2019 | Park ................ G06F 17/153 |
| 11,068,069 | B2 | 7/2021 | Page et al. |
| 11,301,717 | B2 | 4/2022 | Hwang et al. |
| 11,347,962 | B2 | 5/2022 | Kim |
| 11,373,305 | B2 | 6/2022 | Zhang et al. |
| 11,386,144 | B2 | 7/2022 | Chopra et al. |
| 11,386,287 | B2 | 7/2022 | Lian |
| 11,537,860 | B2* | 12/2022 | Holm ................ G06N 3/045 |
| 11,556,757 | B1* | 1/2023 | Matveev ................ G06N 3/04 |
| 11,580,192 | B2* | 2/2023 | Komuravelli ......... G06F 17/153 |
| 11,586,907 | B2* | 2/2023 | Singh ................ G06N 3/08 |
| 2003/0086421 | A1 | 5/2003 | Awsienko et al. |
| 2012/0303932 | A1 | 11/2012 | Farabet et al. |
| 2015/0170021 | A1 | 6/2015 | Lupon et al. |
| 2015/0212955 | A1 | 7/2015 | Easwaran |
| 2015/0278596 | A1 | 10/2015 | Kilty et al. |
| 2016/0379109 | A1 | 12/2016 | Chung et al. |
| 2017/0116495 | A1 | 4/2017 | Nomura et al. |
| 2017/0169315 | A1 | 6/2017 | Vaca Castano et al. |
| 2018/0046458 | A1 | 2/2018 | Kuramoto |
| 2018/0144214 | A1 | 5/2018 | Hsieh et al. |
| 2018/0157970 | A1 | 6/2018 | Henry et al. |
| 2018/0165574 | A1* | 6/2018 | Young ................ G06F 17/16 |
| 2018/0315155 | A1 | 11/2018 | Park et al. |
| 2019/0205738 | A1* | 7/2019 | Bannon ................ G06N 3/045 |
| 2019/0205758 | A1 | 7/2019 | Zhu et al. |
| 2019/0266479 | A1 | 8/2019 | Singh et al. |
| 2019/0266485 | A1 | 8/2019 | Singh et al. |
| 2019/0266784 | A1 | 8/2019 | Singh et al. |
| 2019/0303762 | A1 | 10/2019 | Sui et al. |
| 2020/0057919 | A1* | 2/2020 | Lovin ................ G06N 3/08 |
| 2020/0074289 | A1* | 3/2020 | Yu ................ G06N 3/045 |
| 2020/0125887 | A1 | 4/2020 | Nishii et al. |
| 2020/0134417 | A1 | 4/2020 | Mohapatra et al. |
| 2020/0134435 | A1* | 4/2020 | Gu ................ G06N 3/045 |
| 2020/0134436 | A1 | 4/2020 | Kataeva et al. |
| 2020/0320369 | A1 | 10/2020 | Meng et al. |
| 2021/0057069 | A1 | 2/2021 | Wang et al. |
| 2021/0073569 | A1 | 3/2021 | Gao et al. |
| 2021/0097403 | A1 | 4/2021 | Park et al. |
| 2021/0192246 | A1* | 6/2021 | Yang ................ G06N 3/04 |
| 2021/0192833 | A1 | 6/2021 | Singh et al. |
| 2021/0216483 | A1 | 7/2021 | Liu et al. |
| 2021/0334642 | A1 | 10/2021 | Navarrete Michelini et al. |
| 2021/0343019 | A1 | 11/2021 | Diego Andilla et al. |
| 2021/0374940 | A1 | 12/2021 | Liu et al. |
| 2022/0027740 | A1 | 1/2022 | Dong et al. |
| 2022/0028087 | A1 | 1/2022 | Hu et al. |
| 2022/0036562 | A1 | 2/2022 | Wu et al. |
| 2022/0101140 | A1 | 3/2022 | Satheesh Kumar et al. |
| 2022/0113944 | A1 | 4/2022 | Furukawa |

FOREIGN PATENT DOCUMENTS

| | | |
|---|---|---|
| CN | 105488565 A | 4/2016 |
| CN | 106650655 A | 5/2017 |
| EP | 3480740 A1 | 5/2019 |
| KR | 101947782 B1 | 2/2019 |
| WO | WO 2019227322 A1 | 12/2019 |

OTHER PUBLICATIONS

Blanc-Talon et al (Ed)., *Advanced Concepts for Intelligent Vision Systems*, Springer International Publishing, New York, New York, 2016, pp. 217-227, Desoli et al., "The Orlando Project: A 28nm FD-SOI Low Memory Embedded Neural Network ASIC".

Brownlee, "A Gentle Introduction to Pooling Layers for Convolutional Neural Networks," published online Apr. 22, 2019, downloaded on Dec. 11, 2019, from https://machinelearningmastery.com/pooling-layers-for convolutional-neural-networks/, 19 pages.

Chen et al., "14.5: Eyeriss: An Energy-Efficient Reconfigurable Accelerator for Deep Convolutional Neural Networks," IEEE International Solid-State Circuits Conference, San Francisco, California, Jan. 31-Feb. 4, 2016, pp. 262-264.

Chen et al., "A High-Throughput Neural Network Accelerator," IEEE Micro, 35:24-32, 2015.

Chen et al., "DaDianNao: A Machine-Learning Supercomputer," 47th Annual IEEE/ACM International Symposium on Microarchitecture, Cambridge, United Kingdom, Dec. 13-17, 2014, pp. 609-622.

Choudhary et al., "NETRA: A Hierarchical and Partitionable Architecture for Computer Vision Systems," *IEEE Transactions on Parallel and Distributed Systems* 4(10):1092-1104, 1993.

Cook, "Global Average Pooling Layers for Object Localization," published online Apr. 9, 2019, downloaded on Dec. 11, 2019, from https://alexisbcook.github.io/2017/global-average-pooling-layers-for-object-localization/, 14 pages.

Dai et al., "Deformable Convolutional Networks," PowerPoint Presentation, International Conference on Computer Vision, Venice, Italy, Oct. 22-Oct. 29, 2017, 17 pages.

Dai et al., "Deformable Convolutional Networks," Proceedings of the IEEE International Conference on Computer Vision :764-773, 2017.

Desoli et al., "14.1: A 2.9TOPS/W Deep Convolutional Neural Network SoC in FD-SOI 28nm for Intelligent Embedded Systems," *IEEE International Solid-State Circuits Conference (ISSCC)*, San Francisco, California, Feb. 5-9, 2017, pp. 238-239. (3 pages).

Du et al., "ShiDianNao: Shifting Vision Processing Closer To The Sensor," *2015 ACM/IEEE 42nd Annual International Symposium on Computer Architecture (ISCA)*, Portland, Oregon, Jun. 13-17, 2015, pp. 92-104.

Erdem et al., "Design Space Exploration for Orlando Ultra Low-Power Convolutional Neural Network SoC," IEEE 29th International Conference on Application-specific Systems, Architectures and Processors, Milan, Italy, Jul. 10-12, 2018, 7 pages.

Github, "Building a quantization paradigm from first principles," URL=https://github.com/google/gemmlowp/blob/master/doc/quantization.md, download date Jul. 29, 2021, 7 pages.

Github, "The low-precision paradigm in gemmlowp, and how it's implemented," URL=https://github.com/google/gemmlowp/blob/master/doc/low-precision.md#efficient-handling-of-offsets, download date Jul. 29, 2021, 4 pages.

Gokhale et al., "A 240 G-ops/s Mobile Coprocessor for Deep Neural Networks (Invited Paper)," *The IEEE Conference on Computer Vision and Pattern Recognition (CVPR) Workshop*, Columbus, Ohio, Jun. 23-28, 2014, 6 pages.

Graf et al., "A Massively Parallel Digital Learning Processor," *Advances in Neural Information Processing Syste (NIPS)*, pp. 529-536, 2009.

Han et al., "Deep Compression: Compressing Deep Neural Networks with Pruning, Trained Quantization and Huffman Coding," International Conference on Learning Representations, San Juan, Puerto Rico, May 2-4, 2016, 14 pages.

Hou et al., "An End-to-end 3D Convolutional Neural Network for Action Detection and Segmentation in Videos," *Journal of Latex Class Files* 14(8):2015, 15 pages.

Hou et al., "Tube Convolutional Neural Network (T-CNN) for Action Detection in Videos," International Conference on Computer Vision, Venice Italy, Oct. 22-29, 2017, pp. 5822-5831.

(56) References Cited

OTHER PUBLICATIONS

Hu et al., "MaskRNN: Instance Level Video Object Segmentation," 31st Conference on Neural Information Processing Systems, Long Beach, California, Dec. 4-9, 2017, 10 pages.

Jagannathan et al., "Optimizing Convolutional Neural Network on DSP," IEEE International Conference on Consumer Electronics, Jan. 7-11, 2016, Las Vegas, Nevada, pp. 371-372.

Jain, "Parallel Processing With the TMS320C40 Parallel Digital Signal Processor," Texas Instruments SPRA053: 1-32, Feb. 1994 (34 pages).

Jouppi et al., "In-Datacenter Performance Analysis of a Tensor Processing Unit," 44th International Symposium on Computer Architecture, Toronto, Canada, Jun. 26, 2017, 17 pages.

Kang et al., "T-CNN: Tubelets with Convolutional Neural Networks for Object Detection from Videos," *arXiv:1604.02532*: Aug. 2017, 12 pages.

Kiningham, K. et al., "Design and Analysis of a Hardware CNN Accelerator," Stanford University, 2017, 8 pages.

Krizhevsky et al., "ImageNet Classification with Deep Convolutional Neural Networks," Proceedings of the 25th International Conference on Neural Information Processing Systems 1:1097-1105, 2012 (9 pages).

Kurugöllü et al., "Advanced educational Parallel DSP system based on TMS320C25 Processors," *Microprocessors and Microsystems* 19(3):147-156, 1995.

Lascorz et al., "Tartan: Accelerating Fully-Connected and Convolutional Layers in Deep Learning Networks by Exploiting Numerical Precision Variability," *arXiv:1707.09068v1*:Jul. 2017, 12 pages.

LeCun et al., "Gradient-Based Learning Applied to Document Recognition," Proceedings of the IEEE 86(1):2278 2324, 1998.

Lin et al., "A Digital Circuit of Hyperbolic Tangent Sigmoid Function for Neural Networks," IEEE *International Symposium on Circuits and Systems*, Seattle, Washington, May 18-21, 2008, pp. 856-859.

Lin et al., "Network In Network," *arXiv:1312.4400v3* [cs.NE], Mar. 4, 2014, 10 pages.

Meloni et al., "A High-Efficiency Runtime Reconfigurable IP for CNN Acceleration on a Mid-Range All-Programmable SoC," International Conference on ReConFigurable Computing and FPGAs (ReConFig), Nov. 30-Dec. 2, 2016, Cancun, Mexico, 8 pages.

Merritt, "AI Silicon Gets Mixed Report Card," EE Times, published online Jan. 4, 2018, downloaded on Jan. 15, 2018, from https://www.eetimes.com/document.asp?doc_id=1332799&print=yes, 3 pages.

Moctar et al., "Routing Algorithms for FPGAS with Sparse Intra-Cluster Routing Crossbars," 22nd International Conference on Field Programmable Logic and Applications (FPL), Aug. 29-31, 2012, Oslo, Norway, pp. 91-98.

NVIDIA Deep Learning Accelerator, "NVDLA," downloaded on Dec. 12, from http://nvdla.org/, 2019, 5 pages.

Redmon, "YOLO: Real-Time Object Detection," archived on Jan. 9, 2018, downloaded on Jul. 23, 2019, https://web.archive.org/web/20180109074144/https://pjreddie.com/darknet/yolo/, 11 pages.

Ren et al., "Faster R-CNN: Towards Real-Time Object Detection with Region Proposal Networks," *arXiv:1506.01497v3*, Jan. 2016, 14 pages.

Salakhutdinov et al., "A Better Way to Pretrain Deep Boltzmann Machines," Advances in Neural Processing Systems 25, Lake Tahoe, Nevada, Dec. 3-8, 2012, 9 pages.

Scardapane et al., "Kafnets: kernel-based non-parametric activation functions for neural networks," *arXiv:1707.04035v2*, Nov. 2017, 35 pages.

Sim et al., "14.6: A 1.42TOPS/W Deep Convolutional Neural Network Recognition Processor for Intelligent IoE Systems," International Solid-State Circuits Conference, San Francisco, Californai, Jan. 31-Feb. 4, 2016, pp. 264-266.

Simonyan et al., "Very Deep Convolutional Networks for Large-Scale Image Recognition," International Conference on Learning Representations, San Diego, California, May 7-9, 2015, 14 pages.

Stenström, "Reducing Contention in Shared-Memory Multiprocessors," *Computer* 21(11):26-37, 1988.

Stoutchinin et al., "Optimally Scheduling CNN Convolutions for Efficient Memory Access," *IEEE Transactions on Computer-Aided Design of Integrated Circuits And Systems*, Feb. 4, 2019, 14 pages.

TensorFlow "How to Quantize Neural Networks with TensorFlow," archived on Sep. 25, 2017, downloaded on Jul. 23, 2019 from https://web.archive.org/web/20170925162122/https://www.tensorflow.org/performance/quantization, 10 pages.

Tsang, "Review: DeconvNet—Unpooling Layer (Semantic Segmentation)," published online Oct. 8, 2018, downloaded on Dec. 12, 2019, from https://towardsdatascience.com/review-deconvnet-unpooling-layer semantic-segmentation-55cf8a6e380e, 7 pages.

UFLDL Tutorial, "Pooling," downloaded from http://deeplearning.stanford.edu/tutorial/supervised/Pooling/ on Dec. 12, 2019, 2 pages.

Vassiliadis et al., "Elementary Function Generators for Neural-Network Emulators," *IEEE Transactions on Neural Networks* 11(6):1438-1449, 2000.

Vu et al., "Tube-CNN: Modeling temporal evolution of appearance for object detection in video," *arXiv:1812.02619v1*, Dec. 2018, 14 pages.

Wang et al (Ed)., *Advances in Neural Networks*, Springer Verlag, Berlin, Germany, 2006, pp. 1319-1327, Larkin et al., "An Efficient Hardware Architecture for a Neural Network Activation Fucntion Generator".

Wang et al., "DLAU: A Scalable Deep Learning Accelerator Unit on FPGA," *IEEE Transactions on Computer-Aided Design of Integrated Circuits and Systems* 36(3):2017, 5 pages.

Wikipedia, "Convolutional neural network," downloaded from https://en.wikipedia.org/wiki/Computer_vision on Dec. 12, 2019, 29 pages.

Xu et al., "R-C3D: Region Convolutional 3D Network for Temporal Activity Detection," *arXiv:1703.07814v2*, Aug. 2017, 10 pages.

Zhong, K. et al., "Exploring the Potential of Low-bit Training of Convolutional Neural Networks," *IEEE Transactions on Computer-Aided Design of Intergrated Circuits and Systems*, arXiv:2006.02804, version 4, p. 1-13.

\* cited by examiner

POOLING UNIT FOR DEEP LEARNING ACCELERATION

BACKGROUND

Technical Field

The present disclosure generally relates to convolutional neural networks implemented in electronic systems.

Description of the Related Art

Deep learning algorithms promote very high performance in numerous applications involving recognition, identification and/or classification tasks, however, such advancement may come at the price of significant requirements in terms of processing power. Thus, their adoption can be hindered by a lack of availability of low-cost and energy-efficient solutions. Accordingly, severe performance specifications may coexist with tight constraints in terms of power and energy consumption while deploying deep learning applications on embedded devices.

BRIEF SUMMARY

One embodiment is a pooling unit of a convolutional neural network. The pooling unit includes a cropper configured to receive a feature tensor and to generate a cropped feature tensor including a plurality of data values by cropping the feature tensor. The pooling unit includes a line buffer configured to receive the data values from the cropper, a column calculator configured to perform column pooling operations on data columns from the line buffer, and a row calculator configured to perform row pooling operations on data rows from the column calculator.

One embodiment is a method including receiving, in a pooling unit of a convolutional neural network, a feature tensor and generating a cropped feature tensor including a plurality of data values by cropping the feature tensor with a cropper of the pooling unit. The method includes passing the data values of the cropped feature tensor to a single ported line buffer of the pooling unit. The method includes generating pooled feature data by performing column and row pooling calculations on the data values from the line buffer One embodiment is a method. The method includes receiving, in a pooling unit of a convolutional neural network, a feature tensor, storing, in a configuration register of the pooling unit, pooling window size data, and generating, with the pooling unit, a plurality of pooling windows from the feature tensor in accordance with the pooling window size data. The method includes generating pooled feature data by performing column and row pooling calculations on the data values from the pooling windows.

DETAILED DESCRIPTION

Figure 1:
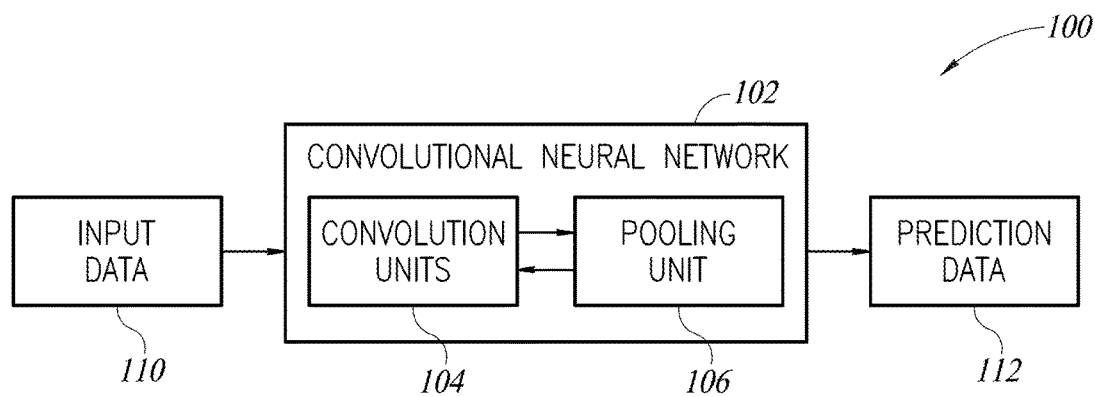
FIG. 1 is a block diagram of an electronic device, according to one embodiment.

FIG. 1 is a block diagram of an electronic device 100, according to one embodiment. The electronic device 100 includes a convolutional neural network (CNN) 102. The CNN 102 receives input data 110 and generates prediction data 112 based on the input data 110. The CNN 102 generates the prediction data 112 by performing one or more convolutional operations on the input data 110.

In one embodiment, the input data 110 is provided by an image sensor (not shown) or another type of sensor of the electronic device 100. Accordingly, the input data 110 can include image data corresponding to one or more images captured by the image sensor. The image data is formatted so that it can be received by the CNN 102. The CNN 102 analyzes the input data 110 and generates the prediction data 112. The prediction data 112 indicates a prediction or classification related to one or more aspects of the image data. The prediction data 112 can correspond to recognizing shapes, objects, faces, or other aspects of an image. While some embodiments herein describe that input data 110 is received from a sensor or sensor system, the input data 110 can be received from other types of systems or devices without departing from the scope of the present disclosure. For example, the input data may 110 may include a data structure stored in a memory and containing statistical data collected and stored by an external CPU. Other types of input data 110 can be utilized without departing from the scope of the present disclosure.

In one embodiment, the CNN 102 is trained with a machine learning process to recognize aspects of training images that are provided to the CNN 102. The machine learning process includes passing a plurality of training images with known features to the CNN. The machine learning process trains the CNN 102 to generate prediction data that accurately predicts or classifies the features of the training images. The training process can include a deep learning process.

The CNN 102 includes a plurality of convolution units 104 and a pooling unit 106. The convolution units 104 implement convolution layers of the CNN 102. Accordingly, each convolution unit is the hardware block that performs the convolution operations corresponding to a convolution layer. The pooling unit 106 implements pooling functions between the convolution layers. The convolution units 104 and the pooling unit 106 cooperate in generating prediction data 112 from the input data 110.

In one embodiment, each convolution unit 104 includes a convolution accelerator. Each convolution unit 104 performs convolution operations on feature data provided to the convolution unit 104. The feature data is generated from the input data 110. The convolution operations at a convolution layer convolve the feature data with kernel data generated during the machine learning process for the CNN 102. The convolution operations result in feature data that is changed in accordance with the kernel data. The new feature data is provided from one convolution unit 104 to the next convolution unit 104.

Pooling operations are performed on the feature data between convolution layers. When feature data is passed from one convolution layer to the next convolution layer, pooling operations are performed on the feature data to prepare the feature data for the convolution operations of the next convolution layer. The pooling unit 106 performs the pooling operations between convolution layers. The pooling unit 106 is used to accelerate convolutional neural network operations. The pooling unit 106 can perform max pooling operations, minimum pooling operations, average pooling operations, or other types of pooling operations.

The output of a convolution layer is a tensor or series of sensors. Tensors are similar to matrices in that they include a plurality of rows and columns with data values in the various data fields. A pooling operation takes a portion, such as a pooling window, of a feature tensor and generates a pooled sub-tensor of reduced dimension compared to the pooling operation. Each data field in the pooled sub-tensor is generated by performing a particular type of mathematical operation on a plurality of data fields (such as taking the maximum value, the minimum value, or the average value from those data fields) from the feature tensor. The pooling operations are performed on each portion of the feature tensor. The various pooling sub-tensors are passed to the next convolution layer as the feature tensor for that convolution layer. Accordingly, pooling helps to reduce data for the next convolution operation and arrange the data for the next convolution operation.

For simplicity, the CNN 102 of FIG. 1 illustrates only convolution units 104 in a pooling unit 106. However, in practice, the CNN 102 may include many other hardware blocks these other hardware blocks can include batch normalization blocks, scaling blocks, biasing blocks, normalization blocks, activation blocks, and other types of hardware blocks that performs various operations as part of the CNN 102.

Figure 2:
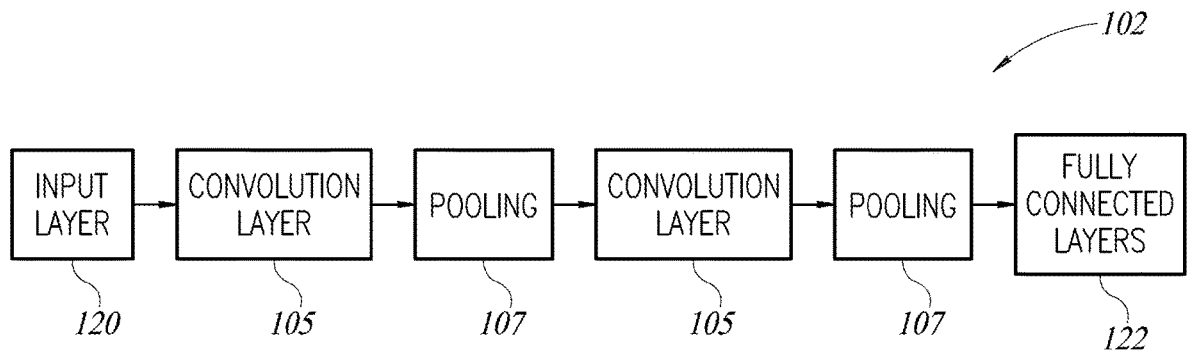
FIG. 2 is a block diagram of process flow within a convolutional neural network, according to one embodiment.

FIG. 2 is a simplified block diagram of process flow within a CNN 102, according to one embodiment. The CNN 102 includes an input layer 120, a plurality of convolution layers 105, and one or more connected layers 121. The input data 110 is provided to the input layer 120 and is passed through the various convolution layers 104 and the fully connected layers 121. The output of the final fully connected layer is the prediction data 112.

Each convolution layer 105 performs a series of convolution operations on the input data 110, or on data generated from the input data 110 by the previous layer of the CNN 102. In particular, kernel data is associated with each convolution layer 105. Each convolution layer 105 performs convolution operations between the kernel data of that convolution layer 105 and the feature data provided to convolution layer 105. The feature data is derived from the input data 110.

In one embodiment, the first convolution layer 105 receives feature data from the input layer 120. The feature data for the first convolution layer 105 is the input data 110. The first convolution layer 105 generates feature data from the input data 110 by performing convolution operations between the feature tensors of the input data 110 and the kernel tensors of the tensor data. The first convolution layer then passes the feature data to the second convolution layer 105. As used herein, each convolution layer 105 receives feature data and convolves the feature data with kernel data, the output of this convolution operation is also referred to as feature data herein. Thus, each convolution layer 105 receives feature data and generates adjusted feature data based on convolution operations. This adjusted feature data is then passed to the next convolution layer 105, which further adjusts the feature data by performing convolution operations on the feature data.

Pooling operations 107 are performed on the feature data between each convolution layer. As described above, the pooling operations reduce the dimensionality of the feature data by performing arithmetic operations on the feature data. The pooling operations also prepare and organize the feature data for the convolution operations of the next convolution layer 105. The pooling unit 106 performs the pooling operations 107.

This processes of convolution and pooling repeat until the final convolution layer 107 has performed convolution operations on the received feature data. Pooling operations 107 are performed on the feature data from the final convolution layer 105. The feature data is then provided to the fully connected layers 122. The fully connected layers 122 then generate prediction data 112 from the feature data. In one embodiment, pooling operations generate pooled feature data.

In practice, the CNN 102 includes other processes than those shown in FIG. 2. In particular, the CNN 102 may include batch normalization operations, scaling operations, biasing operations, normalization operations, activation operations, and other types of operations. Furthermore, the output of a pooling operation can be provided to processes, layers, modules or components other than a convolution layer without departing from the scope of the present disclosure.

Figure 3:
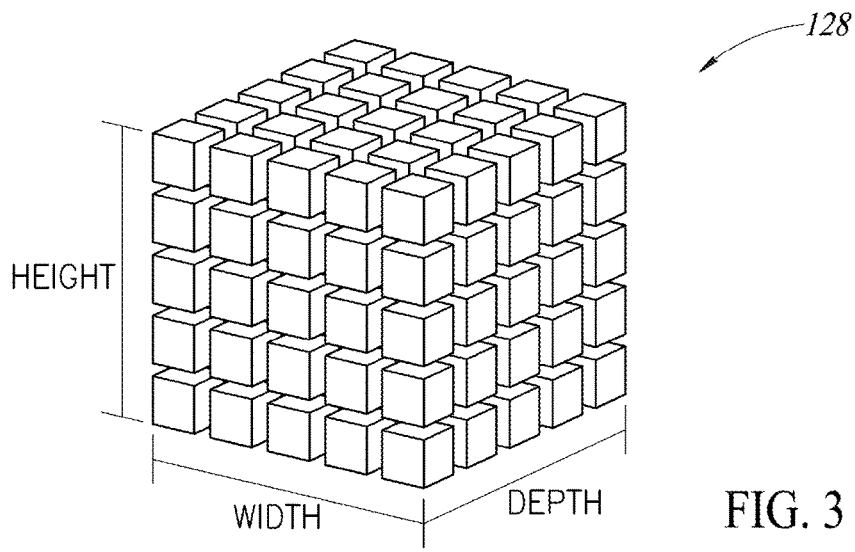
FIG. 3 is a representation of a feature tensor, according to one embodiment.

FIG. 3 is a representation of a feature tensor 128, according to one embodiment. The feature tensor 128 includes a plurality of blocks. Each of these blocks represents a data value. The tensor 128 includes height, width, and depth. While the feature tensor 128 of FIG. 3 illustrates a 5×5×5 tensor, in practice, the feature tensor 128 may include other height, width, and depth dimensions.

In one embodiment, during the pooling operation, the feature tensor 128 is divided into batches. The feature tensor 120 is patched by depth. Pooling operations are performed on the batches from the feature tensor. The pooling operations are performed on the sub-tensors from each batch. Accordingly, each batch is divided into a plurality of sub-tensors.

Figure 4:
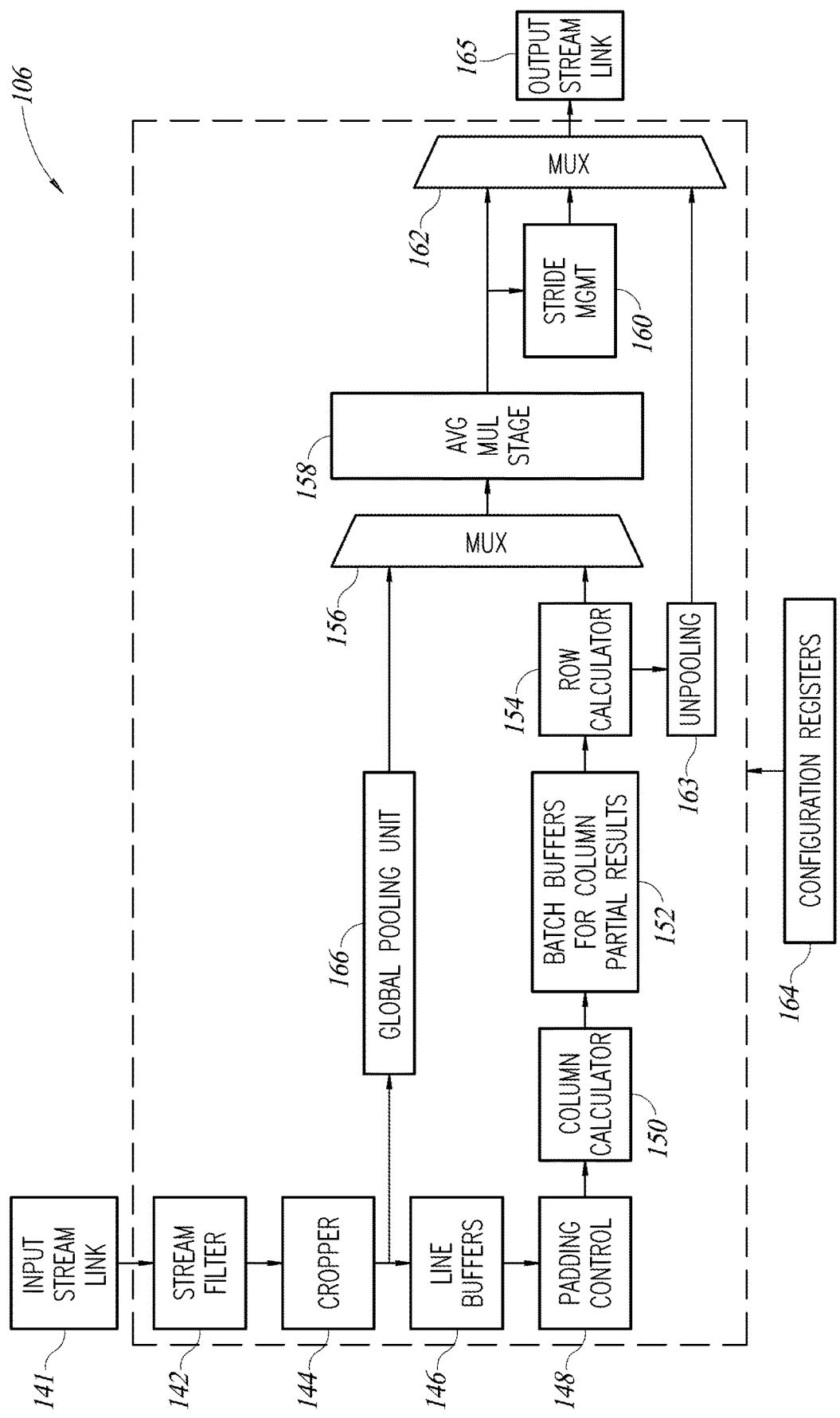
FIG. 4 is a block diagram of a pooling unit, according to one embodiment.

FIG. 4 is a block diagram of a pooling unit 106, according to one embodiment. The pooling unit 106 as part of the hardware block making up the CNN 102. The pooling unit 106 includes a stream filter 142, a cropper 144, line buffers 146, padding control 148, a column calculator 150, batch buffers 152, a row calculator 154, a multiplexer 156, an average multiplier stage 158, a stride manager 160, a multiplexer 162, and an un-pooling unit 163. An input stream link 141 provides data to the pooling unit 106. The pooling unit 106 outputs data to an output stream link 165. The configuration registers 164 store configuration data for the pooling unit 106. The pooling unit 106 performs pooling operations between convolution layers of the CNN 102.

The input of the pooling unit 106 is a 3D feature tensor 128 divided into sub-tensors called batches. The 3D feature tensor 128 is streamed into the pooling unit 106 via the input stream link 141. The width of the stream link 141, and thus the maximum width of the data carried in the stream link 141 can be configured at design time.

In one embodiment, the pooling unit 106 includes the stream filter 142 at the input. The stream filter receives the feature tensor data 128. The stream filter 142 ensures that only a validated stream is input to the pooling unit 106. In one embodiment, the stream filter 142 can be augmented with a first in first out (FIFO) buffer to buffer the input data from the stream link 141.

In one embodiment, the feature tensor 128 is read into the pooling unit 106 from the stream link 141 depth first, followed by width left to right, and finally height from top to bottom. Thus, the data is read across the width and height in the classic raster zigzag scan order, in one embodiment.

In one embodiment, the cropper 144 is configured to crop the input feature tensor 128. In some cases, it is possible that pooling operations should only be performed on certain portions of the feature tensor 128. The cropper 144 can be configured to crop the feature tensor 128 to extract only that portion of the feature tensor 128 on which pooling operations will be performed.

Figure 5A:
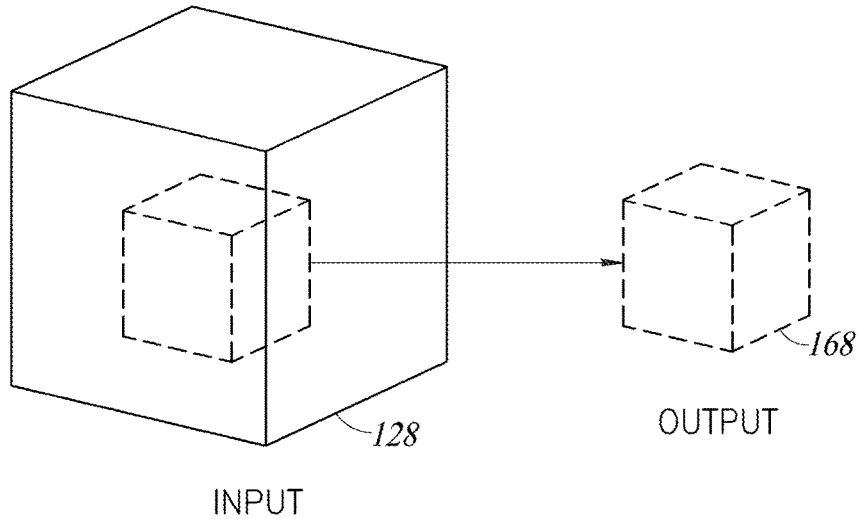
FIG. 5A is an illustration of the cropping operation performed by a cropper, according to one embodiment.

FIG. 5A is an illustration of the cropping operation performed by the cropper 144, according to one embodiment. The feature tensor 128 is input to the cropper 144. The cropper 144 generates a cropped feature tensor 168 from the input feature tensor 128.

The dimensions of the cropped tensor 168 can be selected by a user via the configuration registers 164. In particular, data can be written to the configuration registers 164 indicating how the cropper 144 should crop input feature tensors 128. Accordingly, the configuration register includes dedicated configuration data for the cropper 144. The configuration register can be set with the height, width, and depth indices for cropping the feature tensor 128.

Figure 5B:
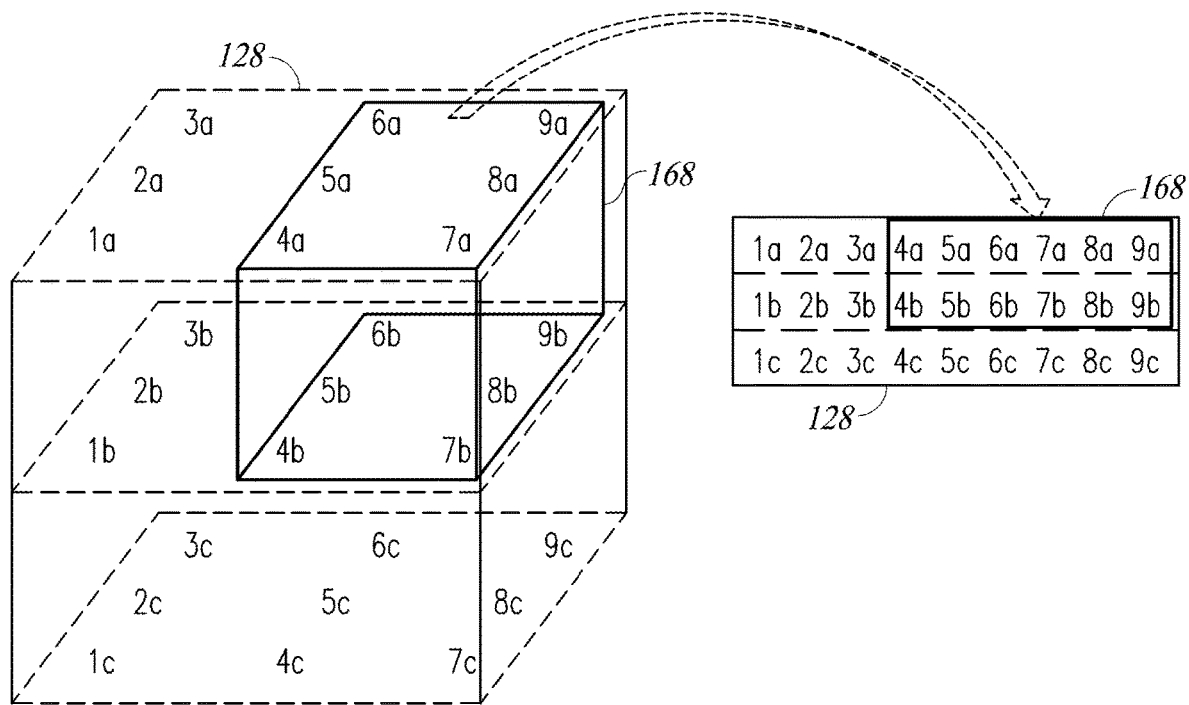
FIG. 5B is an illustration of a cropping operation of a cropper, according to one embodiment.

FIG. 5B is an illustration of a cropping operation of the cropper 144, according to one embodiment. The feature tensor 128 is represented by indices 1a-9c, each representing data positions within the feature tensor 128. FIG. 5B also illustrates the 168 that will result from performing the cropping operation on the feature tensor 128.

FIG. 5B also includes a flattened representation of the feature tensor 128 and the cropped tensor 168. The flattened representation represents the three-dimensional feature tensor 128 and the cropped tensor 168 as two-dimensional tensors.

Figure 6A:
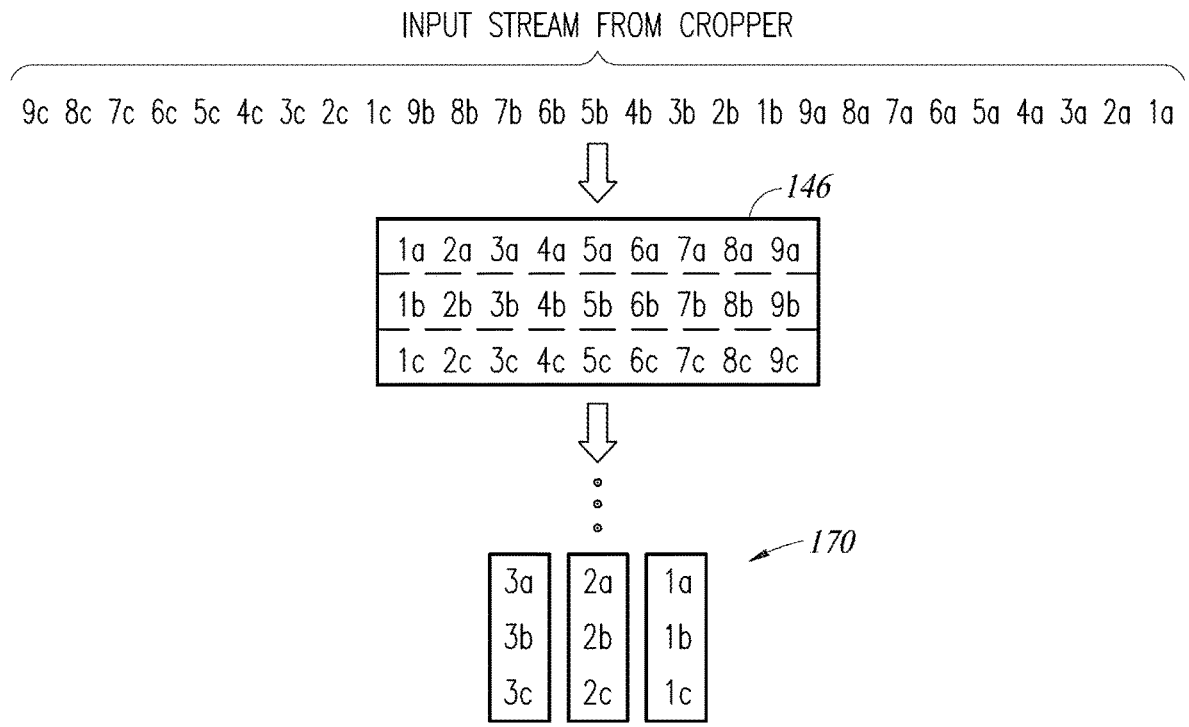
FIG. 6A is an illustration of the line buffer of a pooling unit, according to one embodiment.

FIG. 6A is an illustration of the line buffer 146 of the pooling unit 106 of FIG. 4, according to one embodiment. The line buffer 146 receives an input stream from the cropper 144. The input stream from the cropper 144 corresponds to the cropped feature tensor 168. Alternatively, the input stream from the cropper 144 can be the feature tensor 128 if the cropper 144 is not configured to crop the feature tensor 128. The input stream shown in FIG. 6A corresponds to the indices of the cropped tensor 168 of FIG. 5B.

The line buffer 146 is organized from internal memory of the pooling unit 106. The line buffer 146 buffers horizontal lines of the input in memory. The line buffer 146 can, on request, extract and output vertical columns from the storage lines. Additionally, the line buffer 146 allows reuse of previous lines buffered while storing new incoming lines.

In one embodiment, the line buffer 146 receives the input stream and outputs the feature data in columns 170. Each column 170 includes a data value from a particular position in each row of the line buffer 146. For example, a first column includes the data value from the first position in each row of the line buffer 146. A second column includes the data values from the second position in each row of the line buffer 146. A third column corresponds to the data value from the third position in each row of the line buffer 146, and so on.

In one embodiment, the number of lines and the width of the lines defines the size of the memory for the line buffer 146. For example, a line buffer with five lines can buffer output vertical columns of up to a height of 5.

Figure 6B:
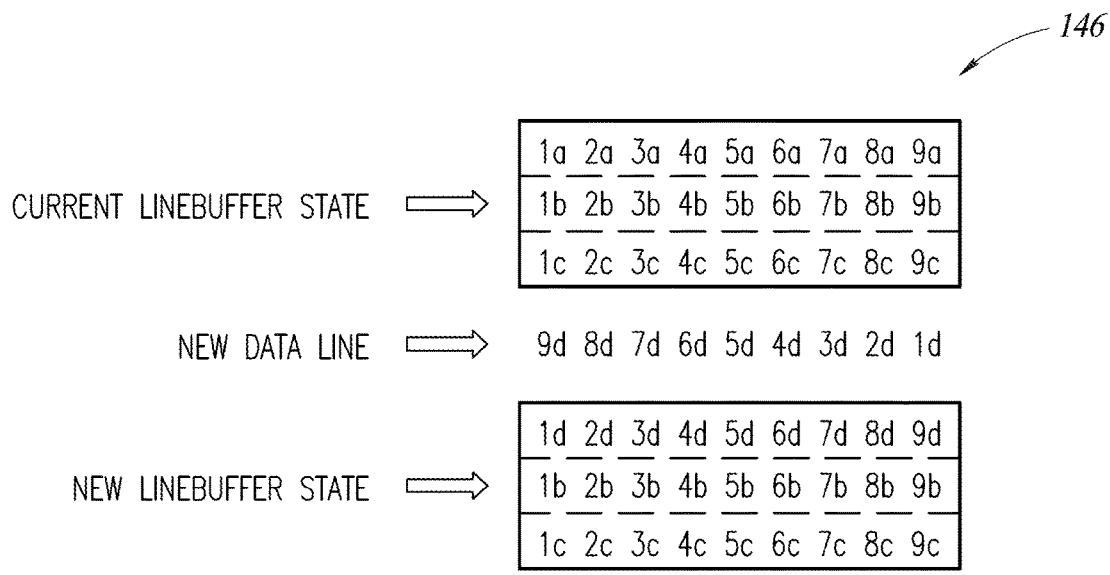
FIG. 6B illustrates an operation of the line buffer of a pooling unit, according to one embodiment.

FIG. 6B illustrates an operation of the line buffer 146 of the pooling unit 106, according to one embodiment. In particular, FIG. 6B illustrates the order in which new lines are filled in the line buffer 146 when all existing lines are full. In the example of FIG. 6B, a new data line is received at the line buffer 146. The top line of the line buffer in its current state is replaced with the new data line. Accordingly, the new buffer state includes the new data line in the top row of the line buffer 146.

In one embodiment, the line buffer 146 is a single ported line buffer. This means that the line buffer 146 includes a single input port and a single output port. The result is that the single ported line buffer 146 has very low power consumption and takes up a small area in of integrated circuit. This can be highly beneficial in terms of power consumption, area consumption, and general efficiency for the pooling unit 106.

Figure 7A:
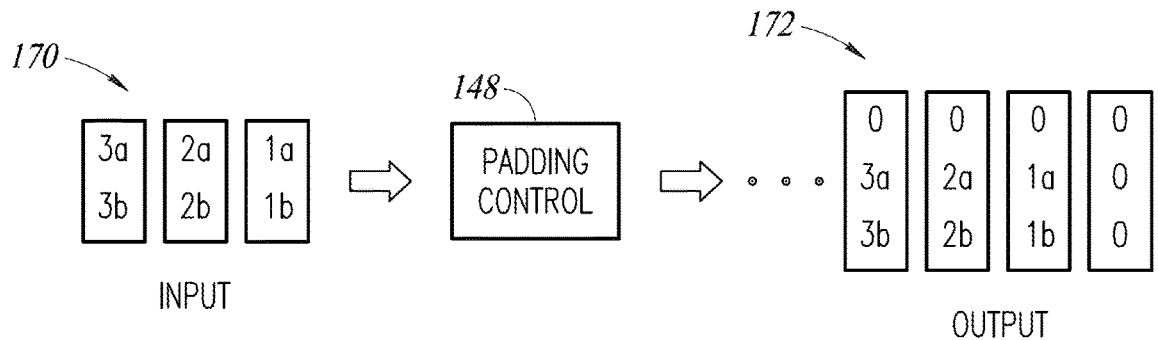
FIG. 7A illustrates an operation of the padding control of a pooling unit, according to one embodiment.

FIG. 7A illustrates an operation of the padding control 148 of the pooling unit 106, according to one embodiment. The padding controller 148 receives the feature data columns 170 from the line buffer 146. The padding controller 148 can pad the feature data columns 170 with a user supplied input padding.

In some cases, padding may be needed to adjust the size of an input data window to a required pooling window as strides are made across the input. This may mean that additional data columns 170 are needed and/or that each data column needs one or more additional rows. In this case, users can configure the configuration data in the configuration registers 164 to cause the padding control 148 to pad the feature data columns 170.

In the example of FIG. 7A, the input feature data columns 170 have a height of two. The padding control 140 is configured to add an extra row of zeros and an extra column of zeros. Accordingly, the padding control 148 generates padded feature data columns 172. The padded feature data columns 172 include an extra column of zeros and an extra row of zeros in each column. Other padding configurations can be selected without departing from the scope of the present disclosure. The padding control 140 may also be configured to not perform any padding. This case, the output of the padding control 148 is the same as the input of the padding control 148.

Figure 7B:
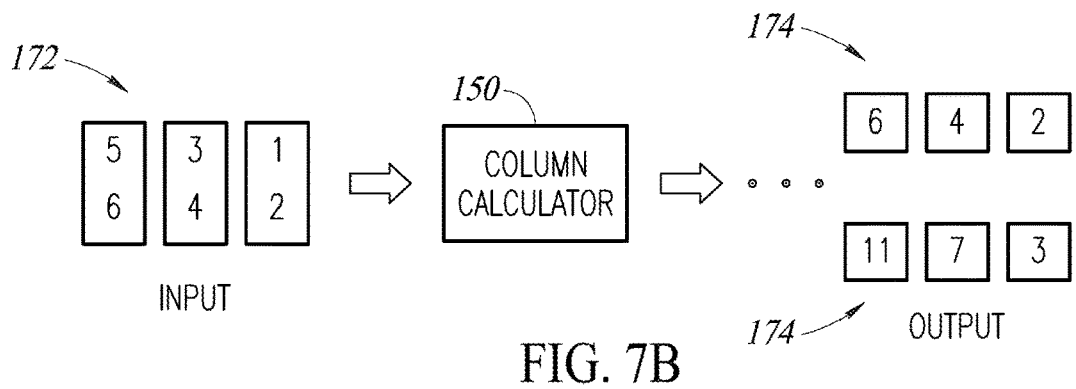
FIG. 7B is an illustration of the column calculator of a pooling unit, according to one embodiment.

FIG. 7B is an illustration of the column calculator 150 of the pooling unit 106, according to one embodiment. The column calculator 150 receives the padded feature data columns 172 from the padding control 148. The column calculator 150 generates output data 174 including, for each column a respective data value.

The output data 174 from the column calculator 150 is based on the type of operation selected for the column calculator 150. The configuration data in the configuration registers 164 can define the type of operation to be performed by the column calculator 150. Some examples of types of operations that can be performed by the column calculator are maximum operations, minimum operations, and average operations.

FIG. 7B illustrates two types of output data 174. The top output data corresponds to a maximum operation performed by the column calculator 150. In the maximum operation, the column calculator determines the maximum value for each input column 172. The column calculator 150 outputs, for each input, 172 a data value corresponding to the maximum of the data values in that column. In the example of FIG. 7B, the maximum value of the first input column 172 is 6, the maximum value of the second input column 172 is 4, and the maximum value of the third input column 172 is 2. Accordingly, the output data 174 for the maximum operation is 6, 4, and 2.

The bottom output data 174 corresponds to a sum calculation of the column calculator 150. For the sum calculation, the column calculator 150 generates, for each input column 172, the sum of the data values in the input column 172. The sum of the data values in the first input column 172 is 11. The sum of the data values in the second input column 172 is 7. The sum of the data values in the third input column 172 is 3. Accordingly, the output data 174 for the sum operation includes the data values 11, 7, and 3.

Figure 8:
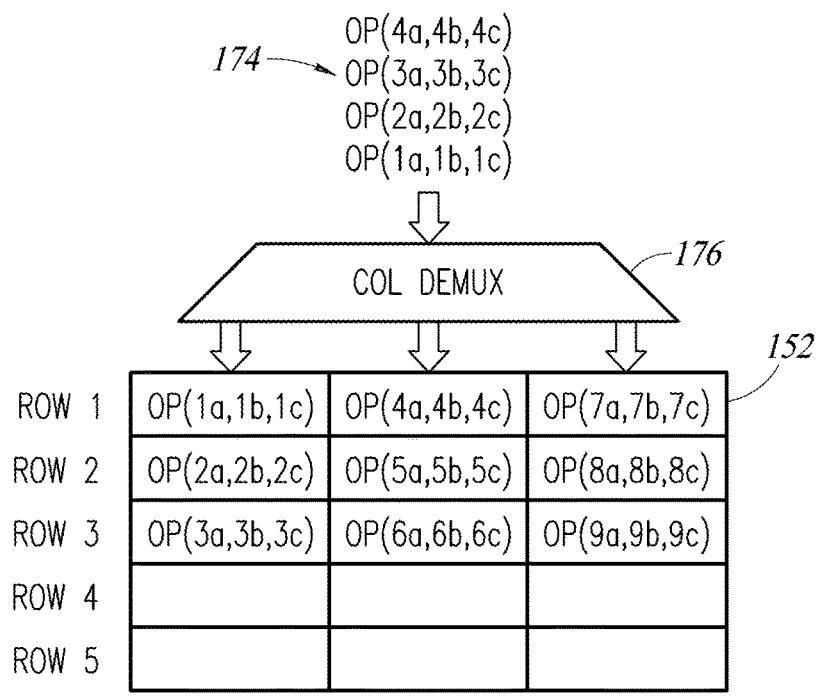
FIG. 8 illustrates an operation of the batch buffer of a pooling unit, according to one embodiment.

FIG. 8 illustrates an operation of the batch buffer 152 of the pooling unit 106, according to one embodiment. The batch buffer 152 receives the data values 174 from the column calculator 150. The batch buffer 152 stores the data values 174 in rows and columns. The batch buffer 152 receives the data values 174 via a column demultiplexer 176. The batch buffer is composed of multiple rows and columns. The maximum number of rows correspond to the maximum batch size the unit is designed to support. For instance if the maximum batch size is 8, the number of rows is 8, thus the unit supports tensors with batch sizes ranging from 1 to 8. In this specific example the tensor batch size is 3, thus 3 rows are occupied even though the actual number of rows could be larger. Similarly the unit can be designed with a number of columns corresponding to the maximum pooling window width dimension expected to be supported. In this figure the number of columns is 3 thus the unit can support pooling window widths of 1, 2 or 3.

The column demultiplexer 176 receives data values 174 and slots them in the desired batch buffer columns, depending on the batch index associated with the incoming columns. In this example, the data value OP(1$a$, 1$b$, 1$c$) corresponds to batch index 0 (batch size=3, thus indices range from 0,1,2), thus is placed in the first batch buffer row. Similarly the next data value OP(2$a$,2$b$,2$c$) corresponds to batch index 1, thus is placed in the second batch buffer row and so o, while the data value OP(4$a$,4$b$,4$c$) corresponds to batch index 0 thus is placed in batch buffer row 0, but column index 1 since it's the result of the second column along the width dimension of the feature tensor. Thus, in the example of FIG. 8, OP(1$a$, 1$b$, 1$c$) corresponds to the data value 174 generated by performing the selected operation of the column calculator on the data column 172 including corresponding to indices 1$a$, 1$b$, and 1$c$ from the feature tensor 128 or the crops feature tensor 168. The column demultiplexer 176 outputs the various data values in 174 in a selected manner in the rows and columns of the batch buffer 152.

Figure 9:
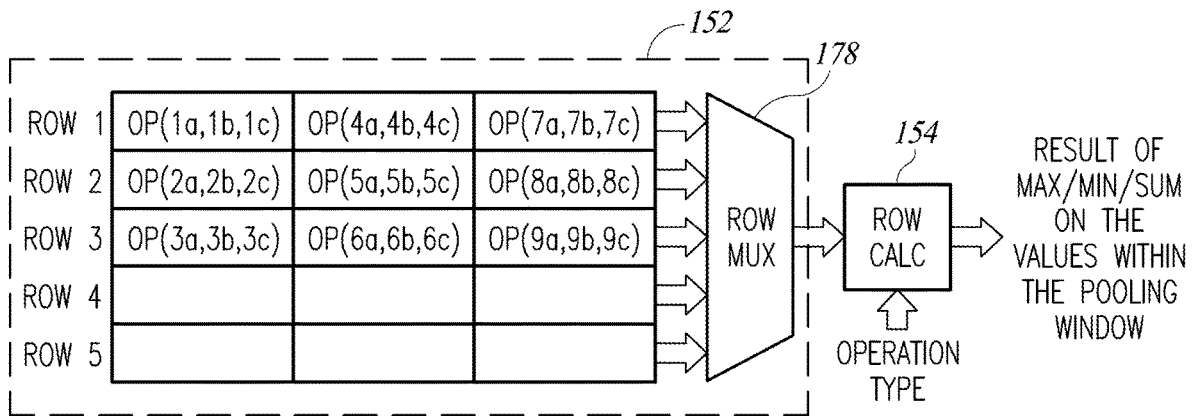
FIG. 9 illustrates an operation of the batch buffer and the row calculator of a pooling unit, according to one embodiment.

FIG. 9 illustrates an operation of the batch buffer 152 and the row calculator 154 of the pooling unit 106, according to one embodiment. The batch buffer 152 outputs the rows of data values 174 to the row multiplexer 178. The row calculator 154 receives rows of data from the row multiplexer 178.

In one embodiment, the row calculator 154 performs an operation on each row from the batch buffer 152. The row calculator 154 outputs, for each row, a data value corresponding to the operation performed on the row. The type of operation to be performed by the row calculator 154 is stored in the configuration registers 164. The operations can include a maximum operation, a minimum operation, or a sum operation.

Figure 10:
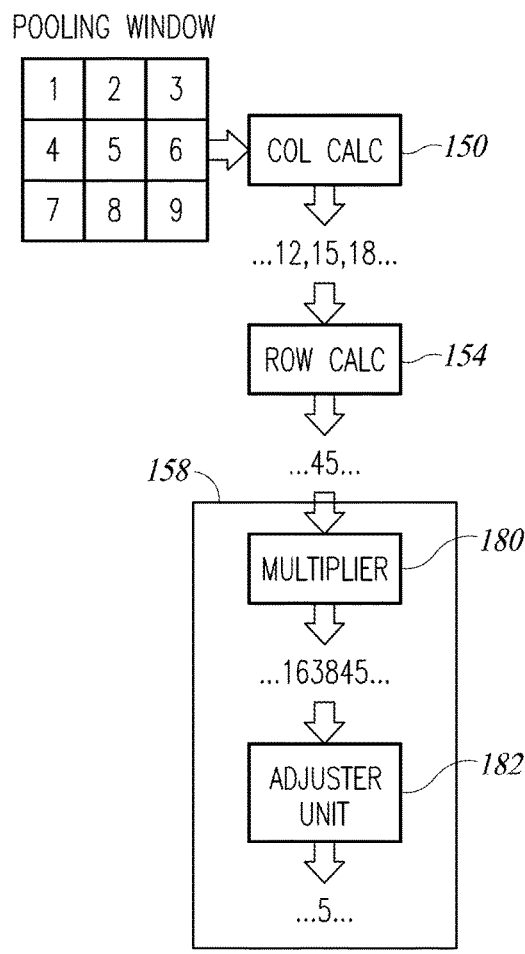
FIG. 10 illustrates a pooling operation performed by a pooling unit, according to one embodiment.

FIG. 10 illustrates a pooling operation performed by the pooling unit 106, according to one embodiment. The configuration registers 164 determine the size of a pooling window for each pooling operation. The pooling window corresponds to a selected portion of the cropped feature tensor 168. The size of the pooling window determines, in part, the magnitude of the reduction in size between the input of the pooling unit 106 and the output of the pooling unit 106.

In the example of FIG. 10, the pooling window is 3×3. If the height and width of the cropped feature tensor 168 is 9×9, the selected pooling window is 3×3, and the stride is 3 (described in more detail below) then for each nonoverlapping 3×3 window of a single depth slice of the cropped feature tensor 168, a single data value will be generated by the pooling operation. This corresponds to nine data values for each 9×9 slice from the cropped feature tensor 168.

A 3×3 sub-tensor is selected from the cropped tensor 168 in the example of FIG. 10. The 3×3 sub-tensor is passed to the column calculator 150. The column calculator 150 is configured to provide, for each column, the sum of the data values in that column. Accordingly, the output of the column calculator is the data values 12, 15, 18. The row calculator 154 is also configured to perform a summing operation. Accordingly, the row calculator 154 generates the data value 45 which is the sum of 12, 15, and 18.

In one example, the selected pooling operation is an average rather than a sum. In this case, the column calculator 150 and the row calculator 150 for each generate a sum as shown in FIG. 10. The total sum of 45 is then provided to the average multiplier stage 158. The average multiplier stage 158 performs an averaging operation on the sum from the row calculator 150. The output of the average multiplier stage is the value of 5. 5 is the average of the values in the 3×3 pooling window. This operation is performed for all of the pooling windows until an average value is generated for each pooling window. A reduced feature tensor has been generated by the pooling unit 106 including each of the values generated for each of the pooling windows.

In one embodiment, the average multiplier stage 158 includes a multiplier 180 and an adjuster unit 182. The effect of the average multiplier stage 158 is to divide the value provided by the row calculator 154 by the number of data values in the pooling window. In the example of FIG. 10, the effect of the average multiplier stage 158 is to divide the output of the row calculator 154 by 9. However, division operations are highly expensive in terms of area in computational power. Accordingly, the multiplier converts the fraction 1/9 to its fixed point Q15 form of 3641. The multiplier then multiplies 3641 by 45, resulting in a value of 163845. This number is provided to the adjuster unit. The adjustor unit 182 downshifts and rounds and saturates (if configured so) the value down to the value of 5, which is the average of the values in the pooling window. In this way, the average multiplier stage 158 can calculate the average of the pooling window.

The multiplier stage 158 consists of a configurable downshift or in support for truncating, rounding, and saturating the downshift in value based on values specified in the pooling unit configuration register 164. Various rounding modes such as rounds to the nearest, and round away from zero, round to nearest even, can be supported. The output can be saturated, if required, by enabling saturation via the configuration registers 164. If saturation is not enabled, the output is simply truncated to output data with. Returning to FIG. 4, the stride manager 160 is responsible to gate the inputs and only allows those sample values to pass based on specified horizontal and vertical strides in the pooling. One embodiment could use 2 counters counting up to the values of the horizontal and vertical strides respectively. The counters are triggered on each arriving input while the output is gated unless the counters are both 0, thus allowing only those values to be output that respect the striding requirements.

In one embodiment, the pooling unit 106 also supports global pooling. In particular, the pooling unit 106 includes a global pooling unit 166. The global pooling unit offers a dedicated data path to perform global pooling on arbitrary sized tensors. Global pooling is different from windowed pooling in the sense that the pooling window encompasses the entire width and height of the input feature tensor. Global pooling bypasses the line buffer 146, the padding control 148, the column calculator 150, the row calculator 154, and the batch buffer 152 which can be clock gated, thus saving runtime power. The global pooling unit 166 is also batch aware.

The pooling unit 106 also supports unpooling. In particular, the unpooling block 163 enables unpooling operations. The unpooling operation augments max and min pooling in convolutional neural network topologies with applications in semantic segmentation among others. In max unpooling, the unpooling block 163 records, for each pooling window, the position in the pooling window from which the max value was drawn. The feature tensor 128 or the cropped feature tensor 168 can be partially regenerated by the unpooling operation. In particular, the max values are placed back in their respective data fields from the feature tensor 128 or the cropped feature tensor 168. The other data fields can be populated with zeros. The unpooling block 163 can do the same thing for minimum pooling, except that the minimum values are placed back in their data fields and the other data fields are populated with zeros.

Figure 11:
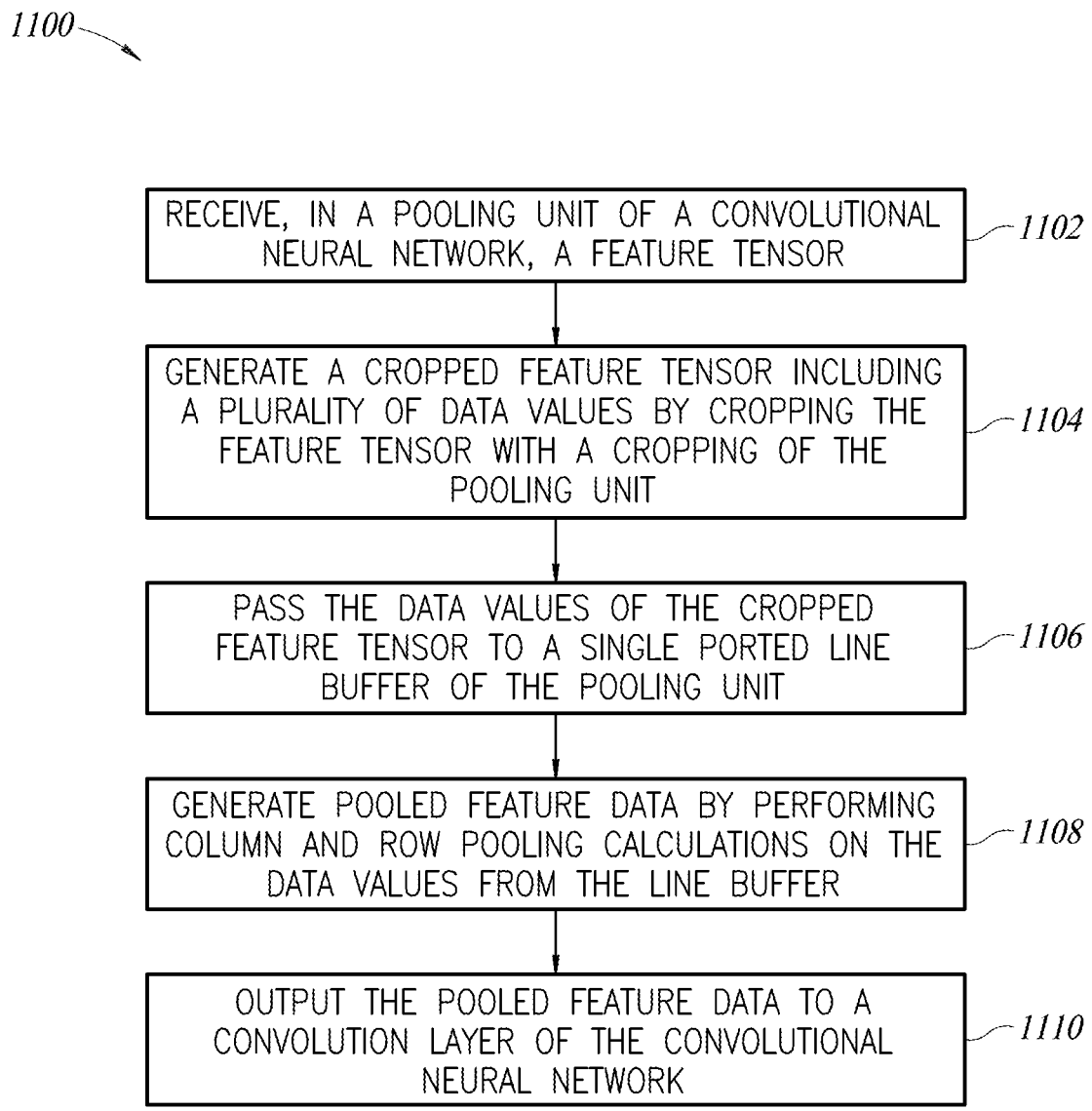
FIG. 11 is flow diagram of a method for operating a convolutional neural network, according to one embodiment.

FIG. 11 is flow diagram of a method 1100 for operating a convolutional neural network, according to one embodiment. At 1102, the method 1100 includes receiving, in a pooling unit of a convolutional neural network, a feature tensor. At 1104, the method 1100 includes generating a cropped feature tensor including a plurality of data values by cropping the feature tensor with a cropper of the pooling unit. At 1106, the method 1100 includes passing the data values of the cropped feature tensor to a single ported line buffer of the pooling unit. At 1108, the method 1100 includes generating pooled feature data by performing column and row pooling calculations on the data values from the line buffer. At 1110, the method 1100 includes outputting the pooled feature data to a convolution layer of the convolutional neural network.

While the method 1100 describes outputting the pooled feature data to a convolution layer, the pooled feature data can be output to layers, processes, components, or modules other than a convolution layer without departing from the scope of the present disclosure. Other variations to the method 1100 can be made without departing from the scope of the present disclosure.

Figure 12:
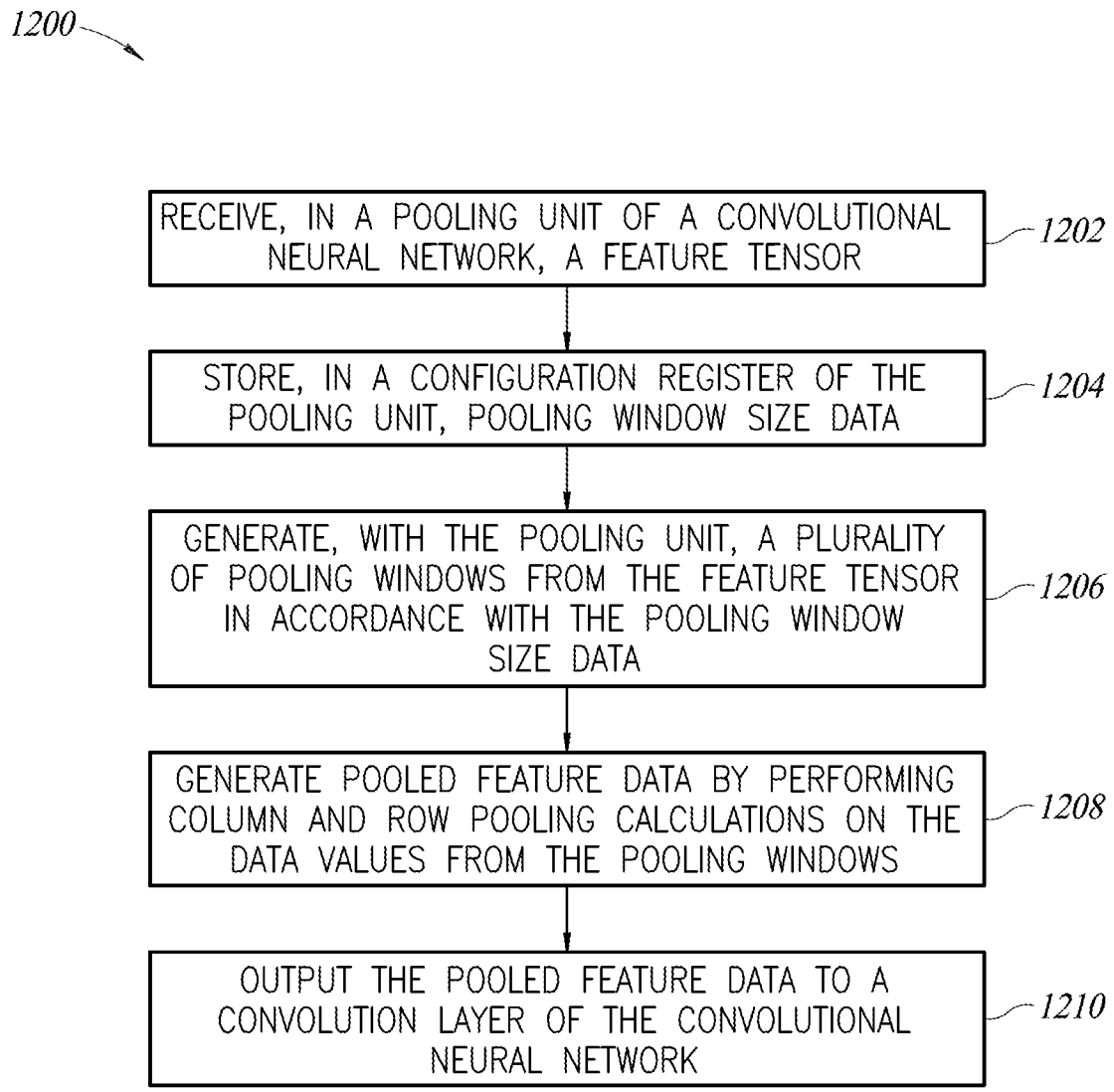
FIG. 12 is flow diagram of a method for operating a convolutional neural network, according to one embodiment.

FIG. 12 is flow diagram of a method 1200 for operating a convolutional neural network, according to one embodiment. At 1202, the method 1200 includes receiving, in a pooling unit of a convolutional neural network, a feature tensor. At 1204, the method 1200 includes storing, in a configuration register of the pooling unit, pooling window size data. At 1206, the method 1200 includes generating, with the pooling unit, a plurality of pooling windows from the feature tensor in accordance with the pooling window size data. At 1208, the method 1200 includes generating pooled feature data by performing column and row pooling calculations on the data values from the pooling windows. At 1210, the method 1200 includes outputting the pooled feature data to a convolution layer of the convolutional neural network.

While the method 1200 describes outputting the pooled feature data to a convolution layer, the pooled feature data can be output to layers, processes, components, or modules other than a convolution layer without departing from the scope of the present disclosure. Other variations to the method 1200 can be made without departing from the scope of the present disclosure.

Further details related to electronic devices implementing convolutional neural networks can be found in U.S. Patent Application Publication 2019/0266479, filed Feb. 20, 2019, in U.S. Patent Application Publication No. 2019/0266485, filed Feb. 20, 2019, and in U.S. Patent Application Publication No. 2019/0266784, filed Feb. 20, 2019, each of which are incorporated herein by reference in their entireties.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
receiving, in a pooling unit of a convolutional neural network, a feature tensor;
storing, in a configuration register of the pooling unit, pooling window size data;
generating, with the pooling unit, a plurality of pooling windows from the feature tensor in accordance with the pooling window size data; and
generating pooled feature data by sequentially performing column and row pooling calculations on data values from the plurality of pooling windows.

2. The method of claim 1, further comprising performing, with an unpooling block of the pooling unit, unpooling operations on the pooled feature data.

3. The method of claim 1, further comprising generating prediction data with the convolutional neural network based, at least in part, on the pooled feature data.

4. The method of claim 1, further comprising outputting the pooled feature data to a convolution layer of the convolutional neural network.

5. A neural network, comprising:
a convolution unit configured to receive feature data and to generate a feature tensor from the feature data; and a pooling unit including a register configured to store pooling window size data, wherein the pooling unit is configured to generate a plurality of pooling windows from the feature tensor in accordance with the pooling window size data and to generate pooled feature data by sequentially performing column and row pooling calculations on data values from the plurality of pooling windows.

6. The neural network of claim 5, wherein the pooling unit includes an unpooling block configured to perform unpooling operations on the pooled feature data.

7. The neural network of claim 5, further comprising a fully connected layer configured to generate prediction data based, at least in part, on the pooled feature data.

8. The neural network of claim 5, wherein the pooling unit is configured to output the pooled feature data to the convolution unit.

9. The neural network of claim 5, wherein the pooling unit includes a cropper configured to receive the feature tensor and to generate a cropped feature tensor including a plurality of data values by cropping the feature tensor;
   a line buffer configured to receive the data values from the cropper;
   a column calculator configured to perform column pooling operations on data columns from the line buffer; and
   a row calculator configured to perform row pooling operations on data rows from the column calculator.

10. The neural network of claim 9, wherein the pooling unit includes a global pooling data path configured to selectively bypass the line buffer, the column calculator, and the row calculator.

11. The neural network of claim 9, wherein the pooling unit includes an unpooling block configured to perform unpooling operations on pooling data from the row calculator and the column calculator.

12. The neural network of claim 9, wherein the pooling unit includes a configuration register configured to store configuration data for the cropper, the column calculator, and the row calculator.

13. The neural network of claim 12, wherein the configuration register stores data indicating a type of pooling operations to be performed by the column calculator and the row calculator.

14. The neural network of claim 12, wherein the configuration register stores data indicating how the cropper should crop the feature tensor.

15. The neural network of claim 9, wherein the pooling unit includes an average multiplication stage configured to generate average values from row pooling data generated by the row calculator.

16. The neural network of claim 9, wherein the pooling unit includes a padding control block configured to pad the data columns from the line buffer and to pass the padded data columns to the column calculator.

17. A method, comprising:
    receiving, at an input layer of a convolutional neural network, feature data;
    generating, with a first convolutional layer of the convolutional neural network, a first feature tensor from the feature data;
    receiving the first feature tensor at a first pooling layer of the convolutional neural network;
    generating, with a pooling unit, a plurality of pooling windows from the first feature tensor in accordance with pooling window size data stored in a configuration register of the pooling unit associated with the first pooling layer; and
    generating, with the first pooling layer, first pooled feature data by sequentially performing column and row pooling calculations on data values from the plurality of pooling windows; and
    passing the first pooled feature data to a second convolutional layer of the convolutional neural network.

18. The method of claim 17, comprising generating, from the first pooled feature data, a second feature tensor with the second convolutional layer.

19. The method of claim 18, comprising generating, from the second feature tensor, second pooled feature data with a second pooling layer of the convolutional neural network.

20. The method of claim 19, comprising generating, with a fully connected layer of the convolutional neural network, prediction data based on the second pooled feature data.

* * * * *